United States Patent
Jiang et al.

(10) Patent No.: US 6,188,712 B1
(45) Date of Patent: Feb. 13, 2001

(54) ASYMMETRICAL DISTRIBUTED FEEDBACK FIBER LASER

(75) Inventors: Shijun Jiang, Wakefield; Steven P. Bastien, Narragansett; Mala Krishnan, Wakefield, all of RI (US)

(73) Assignee: Optigain, Inc., Peace Dale, RI (US)

( * ) Notice: Under 35 U.S.C. 154(b), the term of this patent shall be extended for 0 days.

(21) Appl. No.: 09/370,444

(22) Filed: Aug. 9, 1999

Related U.S. Application Data

(60) Provisional application No. 60/107,054, filed on Nov. 4, 1997.

(51) Int. Cl.$^7$ ...................................................... H01S 3/07
(52) U.S. Cl. .................................. 372/96; 372/6; 372/102; 372/106
(58) Field of Search .................... 385/37; 372/6, 372/92, 95, 96, 98, 102, 106

(56) References Cited

U.S. PATENT DOCUMENTS

| | | | |
|---|---|---|---|
| 4,935,932 | 6/1990 | Johnson et al. | 372/33 |
| 5,164,946 | 11/1992 | Negus et al. | 372/20 |
| 5,172,391 | 12/1992 | Zayhowski | 372/106 |
| 5,177,764 | 1/1993 | Nilsson | 372/94 |
| 5,197,073 | 3/1993 | Oka | 372/22 |
| 5,237,576 | 8/1993 | DiGiovanni et al. | 372/6 |
| 5,305,335 | 4/1994 | Ball et al. | 372/6 |
| 5,381,427 | 1/1995 | Wedekind et al. | 372/19 |
| 5,455,835 | 10/1995 | Atkins et al. | 372/6 |
| 5,511,083 | 4/1996 | D'Amato et al. | 372/6 |
| 5,530,710 | 6/1996 | Grubb | 372/6 |
| 5,561,675 | 10/1996 | Bayon et al. | 372/6 |
| 5,644,584 | 7/1997 | Nam et al. | 372/20 |
| 5,647,038 | 7/1997 | Minden et al. | 385/37 |
| 5,666,372 | 9/1997 | Ball et al. | 372/6 |
| 5,666,373 | 9/1997 | Sharp et al. | 372/18 |
| 5,677,920 | 10/1997 | Waarts et al. | 372/6 |
| 5,684,590 | 11/1997 | Sanders et al. | 356/350 |
| 5,710,786 | 1/1998 | Mackechnie et al. | 372/6 |
| 5,771,251 | 6/1998 | Kringlebotn et al. | 372/6 |
| 5,774,484 | * 6/1998 | Wyatt et al. | 372/6 |
| 5,844,927 | * 12/1998 | Kringlebotn | 372/6 |
| 5,910,962 | * 6/1999 | Pan et al. | 372/6 |

* cited by examiner

Primary Examiner—John D. Lee
(74) Attorney, Agent, or Firm—Barlow, Josephs & Holmes

(57) ABSTRACT

A DFB fiber laser comprises a single-mode, rare-earth doped optical fiber having a uniform Bragg grating with a reflectivity of about 90%, and a single-mode, hi-birefringent optical fiber having a uniform Bragg grating with a reflectivity of near 100%. The output end of the hi-bi fiber is coupled to the input end of the doped fiber to form an asymmetrical fiber laser cavity. The input end of the hi-bi fiber is pumped by a light source (laser diode) having a wavelength in the absorption range of the doped fiber. Pump light entering the hi-bi fiber is passed into the doped fiber to produce a stimulated output. The hi-bi fiber provides single polarization operation, acts as an end reflector to provide single longitudinal mode operation in the laser cavity while also providing single sided output.

21 Claims, 2 Drawing Sheets

ASYMMETRICAL DISTRIBUTED FEEDBACK FIBER LASER

This application claims benefit of Provisional Application 60/107,054 filed Nov. 4, 1997.

STATEMENT REGARDING FEDERALLY SPONSORED RESEARCH OR DEVELOPMENT

This invention was made with Government support under contract DASG60-96-C-0073 awarded by U.S. Army Space and Missile Defense Command. The government has certain rights in the invention.

BACKGROUND OF THE INVENTION

The present invention relates to distributed feedback (DFB) fiber lasers, and more particularly to an asymmetrical DFB fiber laser which operates in a single longitudinal mode, and a single polarization mode, and has a single sided output.

In a DFB fiber laser, a symmetrical Bragg grating is written into a length of rare-earth doped optical fiber to form a lasing cavity. Bragg gratings are created within the optical fiber by exposing the fiber to ultraviolet radiation to produce refractive index changes in the fiber. A periodic pattern is imposed on the impinging radiation by, e.g. superimposing a pair of beams of substantially monochromatic radiation to create an interference pattern. When the patterned radiation field impinges on the fiber, a corresponding pattern is imposed on the core of the fiber in the form of periodic fluctuations in the core refractive index. The general techniques for creating Bragg reflectors are now well known in the art. The Bragg grating fluctuations function as a wavelength selective reflector having a reflectance curve with a well-defined peak, thus allowing the fiber to output light of a fairly narrow wavelength band.

It is well known that a DFB fiber laser having a symmetrical Bragg grating (without a $\pi/2$ phase shift), and no end reflectors, will oscillate in two longitudinal modes spaced symmetrically around the Bragg wavelength. To obtain single frequency, i.e. single longitudinal mode, operation of a DFB fiber laser, an end reflector (mirror) can be used to change the round-trip phase shift in the cavity. The end reflector thus provides a single longitudinal mode, and also provides a single sided output that boosts output power in the direction of the output. This extra power is desirable in many circumstances. Alternatively, a phase shift of $\pi/2$ can be introduced into the grating by localized heating or UV light exposure of the fiber wherein the round trip phase condition is satisfied at the Bragg wavelength. The use of both the end reflector and introduction of the $\pi/2$ phase shift are discussed in U.S. Pat. No. 5,771,251 to Kringlebotn et al. While the reflector is effective for achieving operation in a single longitudinal mode and for producing a single sided output, the device still does not operate in a single polarization mode. Introduction of the $\pi/2$ phase shift produces a single longitudinal mode but does not provide single sided-output.

Polarization mode is also a crucial issue with DFB fibers lasers. Since single mode fibers usually have a circular cross section, there is no preference in gain and loss between the two Eigen polarization modes. This means that a DFB fiber laser normally emits two polarization modes. Fiber lasers such as this cannot be used in applications where single polarization light is required. A typical example in communications systems where the light from the fiber laser is coupled into a Lithium Niobate electro-optical modulator. Mode coupling mechanisms, such as introducing stress in the fiber, twisting the fiber, or stretching the fiber are the most current approaches to achieving single polarization operation of a DFB fiber laser. An article by Z. E. Harutjunian, et al titled "Single Polarization Twisted Distributed Feedback Fiber Laser", *ELECTRONICS LETTERS*, Vol. 32, No. 4 (Feb. 15, 1996) discusses in detail twisting of the fiber to achieve operation in a single polarization mode.

Accordingly, while there have been attempts to provide a DFB fiber laser which has one or two of the desired operating characteristics, none of the present solutions adequately provides a DFB fiber laser having simple structure which also has all three of the desired operating characteristics.

SUMMARY OF THE INVENTION

The present invention provides an improved DFB fiber laser comprising a single mode, rare-earth doped optical fiber having a symmetrical grating structure with a reflectivity of about 90%, and a hi-birefringent, single mode optical fiber having a symmetrical grating with a reflectivity of near 100% which is coupled to the input end of the doped fiber. The fiber laser is pumped by a light source, preferably a laser diode, coupled to the input end of the hi-bi fiber. Pump light passes through the hi-bi fiber to the doped fiber where the light produces a stimulated output in the desired wavelength range. The hi-bi fiber provides single polarization operation, and acts as an end reflector to provide single longitudinal mode operation, while also providing single sided output. The coupled fibers thus form an asymmetrical fiber laser cavity which operates in a single longitudinal mode, single polarization mode, and which also has a single sided output.

Accordingly, among the objects of the present invention are: the provision of a DFB fiber laser which operates in a single longitudinal mode, single polarization mode, and has a single sided output; the provision of such a DFB fiber laser comprising a single mode, rare-earth doped optical fiber having a symmetrical grating structure with a reflectivity of about 90%, and a hi-birefringent, single mode optical fiber having a symmetrical grating with a reflectivity of near 100%; and the provision of a DFB fiber laser which is simple and inexpensive to construct and small in size.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
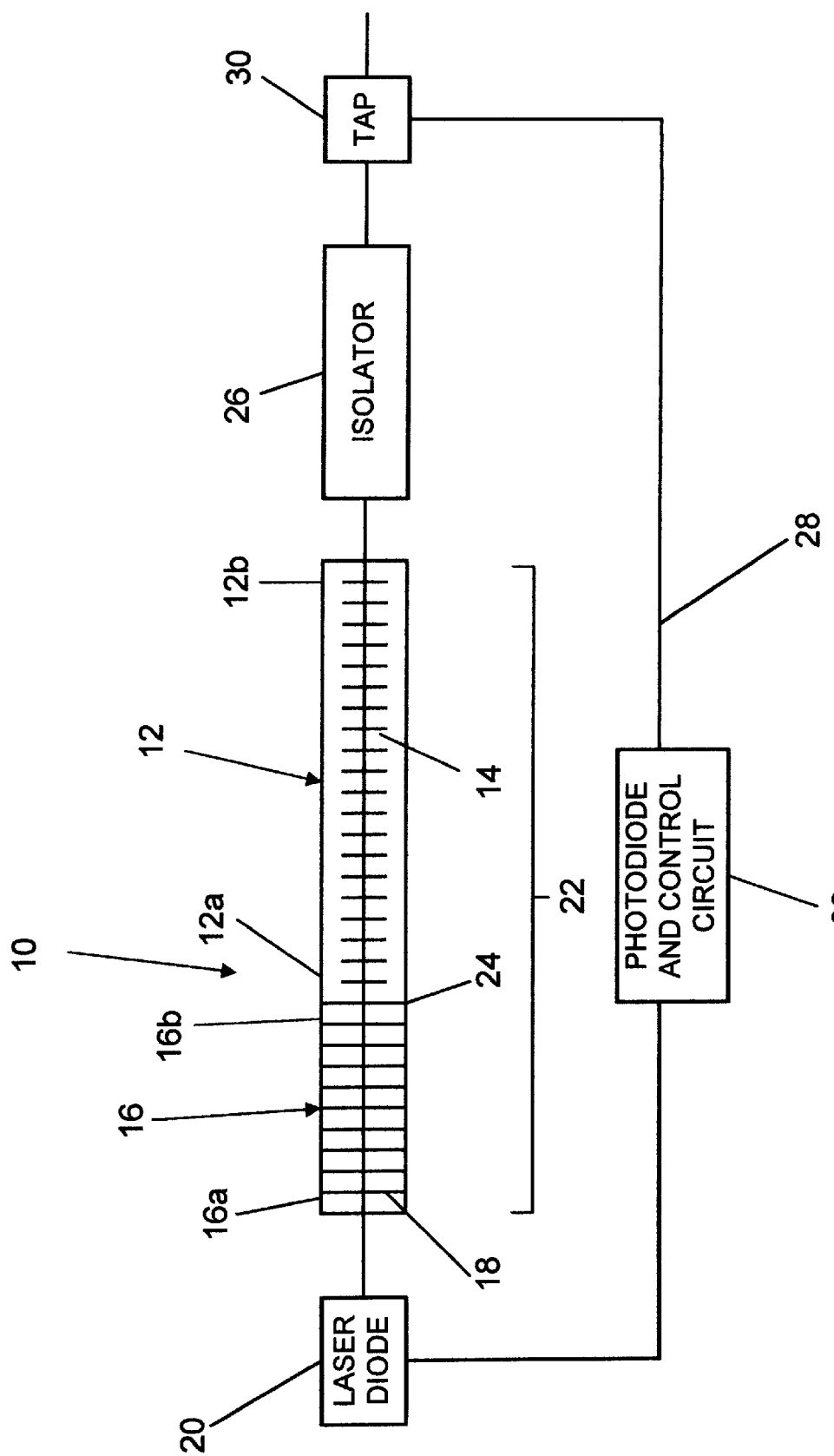
FIG. 1 is a schematic illustration of a first embodiment of the DFB fiber laser.
Figure 2:
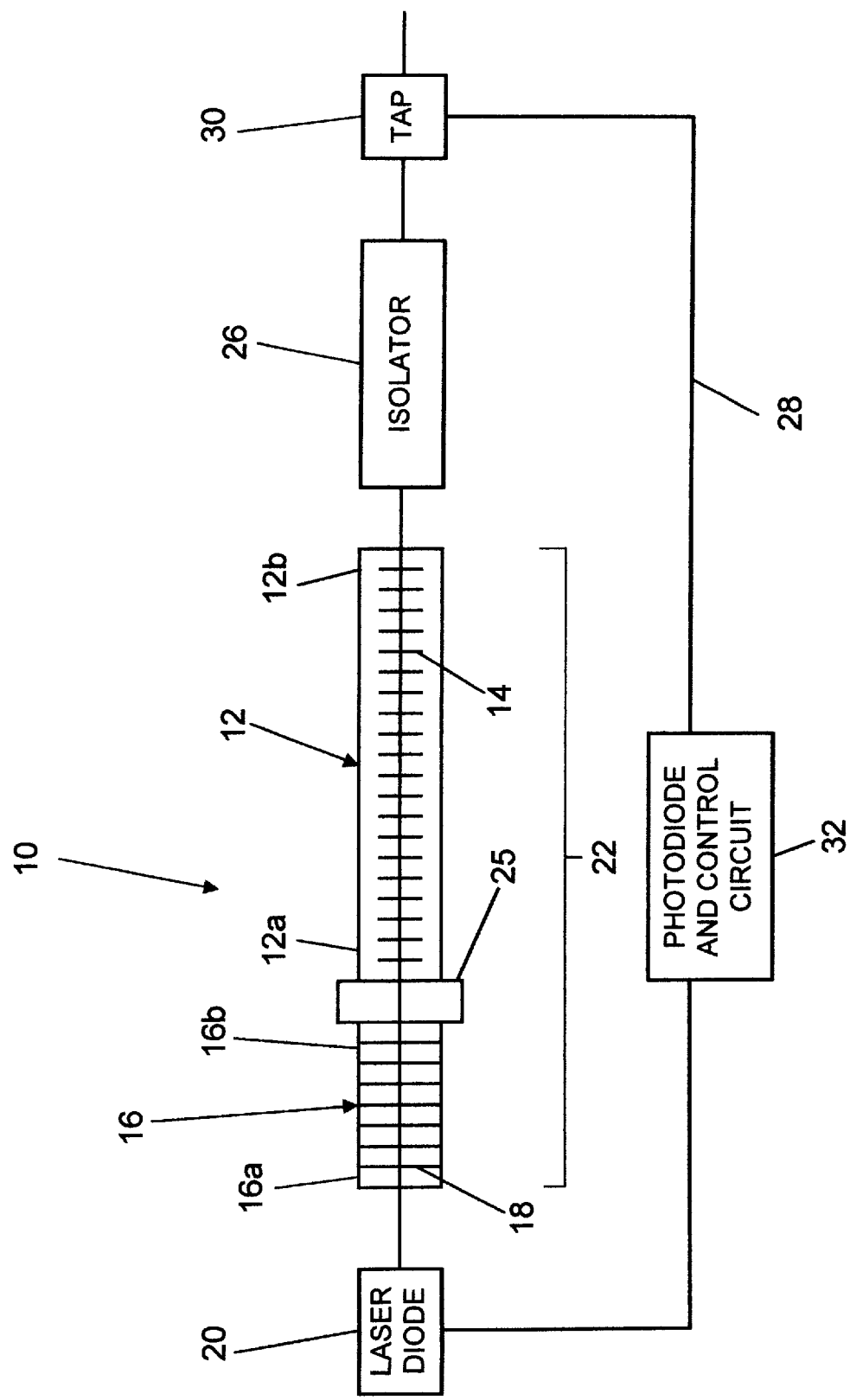
FIG. 2 is a schematic illustration of a second embodiment of the DFB fiber laser.

Referring now to the drawings, the asymmetrical DFB fiber laser assembly of the instant invention is illustrated and generally indicated at 10 in FIGS. 1 and 2. As will hereinafter be more fully described, the DFB fiber laser assembly 10 comprises a single mode, rare-earth doped optical fiber generally indicated at 12 having a Bragg grating 14 with a reflectivity of about 90%, a hi-birefringent, single mode optical fiber generally indicated at 16 having a Bragg grating 18 with a reflectivity of near 100%, and a light source generally indicated at 20 coupled to the hi-bi fiber 16.

The single-mode, rare-earth doped optical fiber 12 is well known in the fiber optic arts, and is available from any one of a variety of commercial sources. The fiber 12 is doped with a rare earth ion, such as erbium, to provide a stimulated light emission as pump light passes through the doped fiber 12. For example, an erbium doped silica fiber is suitable for the present application. The fiber 12 is provided with a uniform Bragg grating 14 having a reflectivity of between about 80%–95%, but more preferably about 90%. The creation of Bragg gratings in optical fibers is well known in the art, and will not be described further herein. The grating 14 is written into the fiber so that the fiber produces an output with a desired wavelength as is common in the art of DFB fiber lasers. It is desirable to keep the length of the fiber 12 short, and in this regard it is preferred that the length of the fiber 12 be limited to between about 2 cm to about 6 cm. Reflectivity of the grating is generally determined by the lasing wavelength, the dopant level and the length of the fiber. The preferred fiber 12 should have a length between about 2 cm and about 6 cm, and have a reflectivity of about 90%.

The light source 20 comprises any known, or unknown, light source having an output wavelength within the rare-earth absorption spectrum. Such light sources include, but are not limited to semiconductor laser diodes, as well as other light sources. In keeping with the previously discussed erbium doped fiber example, a representative light source comprises a 50 mW semiconductor laser diode having a 980 nm or 1480 nm wavelength output.

The hi-birefringent (hi-bi), single mode optical fiber 16 is of a type that is also well known in the optical fiber art and that is also available from a variety of commercial sources. Examples of suitable hi-bi fibers include elliptical fibers wherein the indices of refraction are different along orthogonal axes of the fiber, panda and bow-tie fibers, the most important criteria being that the grating written into such hi-bi fiber can induce a highly polarization dependent reflectivity therefrom leading to a single polarization oscillation in the laser cavity. In accordance with the teachings of the invention, the hi-bi fiber is provided with a uniform Bragg grating having a reflectivity of substantially 100%. The fiber is provided in a length of about 0.5 cm to about 1 cm in length, but should generally be no longer than necessary to achieve near 100% reflectivity within the fiber. It is noted that the total length of the laser cavity 22, i.e. combined lengths of the doped fiber 12, and hi-bi fiber 16, should be no longer than 8 cm total.

The output end 16b of the hi-bi fiber 16 is coupled to the input end 12a of the rare-earth doped fiber 12 to form an asymmetrical fiber laser cavity 22 which operates in a single longitudinal mode, single polarization mode, and which also has a single sided output. Coupling of the two fibers 12, 16 together can be accomplished by either a conventional fusion splice 24, such as shown in FIG. 1, or by a mechanical coupling, such as a butt coupling 25, as shown in FIG. 2, or by any other suitable coupling technique. The butt coupling as illustrated in FIG. 2 is of a type that is well known in the art. Other mechanical couplers are well known in the fiber optic arts. The input end 16a of the hi-bi fiber is pumped with light from the light source 20 in a conventional manner. Pump light from the light source passes through the hi-bi fiber 16 into the doped fiber 12 where the pump light excites the rare earth ions and produces a stimulated light output in the desired wavelength range. As per our example with an erbium doped fiber, the stimulated emission would be in the 1550 nm (erbium) range. In operation, the hi-bi fiber 16 provides single polarization operation, and acts as an end reflector to provide single longitudinal mode operation, while also providing a single sided output resulting in additional power.

The assembly 10 further comprises an optical isolator 26 coupled to the output end 12b of the doped fiber 12 to prevent unwanted feedback into the laser cavity 22. Still further, in order to stabilize output power from the laser, the assembly 10 preferably includes a conventional feedback loop generally indicated at 28. The feedback loop 28 includes a tap coupler with a photodiode and control circuit 32 downstream of the isolator. An optoelectronic feedback loop stabilizes the output power of the DFB fiber laser by monitoring the tapped output, and changing the pump power accordingly to maintain constant output power.

It can therefore be seen that the preset invention provides a DEB fiber laser assembly which operates in a single longitudinal mode, single polarization mode, and has a single sided output. The hi-bi fiber provides single polarization operation, and acts as an end reflector to provide single longitudinal mode operation, while also providing single sided output. The device is compact in size, inexpensive and easy to manufacture. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An asymmetrical DFB fiber laser assembly comprising:
   a single-mode, rare-earth doped optical fiber having a grating, said grating having a reflectivity which is less than 100%;
   a hi-birefringent, single mode optical fiber having an input end and an output end that is coupled to an input end of said single-mode rare-earth doped optical fiber, said hi-birefringent, single mode optical fiber having a grating, said grating having a substantially 100% reflectivity; and
   a light source coupled to said input end of said hi-birefringent, single mode optical fiber, said light source having an output wavelength within the rare-earth absorption spectrum.

2. The asymmetrical DFB fiber laser assembly of claim 1 wherein said output end of said hi-birefringent, single mode optical fiber is coupled to said input end of said single-mode rare-earth doped optical fiber by a splice.

3. The asymmetrical DFB fiber laser assembly of claim 1 wherein said output end of said hi-birefringent, single mode optical fiber is coupled to said input end of said single-mode rare-earth doped optical fiber by a mechanical coupler.

4. The asymmetrical DFB fiber laser assembly of claim 1 wherein said light source comprises a semiconductor laser diode.

5. The asymmetrical DFB fiber laser assembly of claim 1 wherein said single-mode, rare-earth doped optical fiber has a reflectivity of about 90%.

6. The asymmetrical DFB fiber laser assembly of claim 5 wherein said hi-birefringent single mode optical fiber has a length of between about 0.1 cm and about 1.0 cm.

7. The asymmetrical DFB fiber laser assembly of claim 6 wherein said hi-birefringent, single mode optical fiber has a length of about 0.5 cm.

8. The asymmetrical DFB fiber laser assembly of claim 6 wherein a combined length of the hi-birefringent, single mode optical fiber, and the single-mode rare-earth doped optical fiber is between about 4.0 cm and about 8.0 cm.

9. The asymmetrical DFB fiber laser assembly of claim 5 wherein said single mode, rare-earth doped optical fiber has a length of between about 2.0 and about 6.0 cm.

10. The asymmetrical DFB fiber laser assembly of claim 9 wherein a combined length of the hi-birefringent, single mode optical fiber, and the single-mode rare-earth doped optical fiber is between about 4.0 cm and about 8.0 cm.

11. The asymmetrical DFB fiber laser assembly of claim 5 wherein a combined length of the hi-birefringent, single mode optical fiber, and the single-mode rare-earth doped optical fiber is between about 4.0 cm and about 8.0 cm.

12. The asymmetrical DFB fiber laser assembly of claim 1 wherein said hi-birefringent, single mode optical fiber has a length of between about 0.1 cm and about 1.0 cm.

13. The asymmetrical DFB fiber laser assembly of claim 12 wherein said hi-birefringent, single mode optical fiber has a length of about 0.5 cm.

14. The asymmetrical DFB fiber laser assembly of claim 12 wherein said single mode, rare-earth doped optical fiber has a length of between about 2.0 and about 6.0 cm.

15. The asymmetrical DFB fiber laser assembly of claim 12 wherein a combined length of the hi-birefringent, single mode optical fiber, and the single, mode rare-earth doped optical fiber is between about 4.0 cm and about 8.0 cm.

16. The asymmetrical DFB fiber laser assembly of claim 1 wherein said single mode, rare-earth doped optical fiber has a length of between about 2.0 and about 6.0 cm.

17. The asymmetrical DFB fiber laser assembly of claim 16 wherein a combined length of the hi-birefringent, single mode optical fiber, and the single-mode rare-earth doped optical fiber is between about 4.0 cm and about 8.0 cm.

18. The asymmetrical DFB fiber laser assembly of claim 1 wherein a combined length of the hi-birefringent, single mode optical fiber, and the single-mode rare-earth doped optical fiber is between about 4.0 cm and about 8.0 cm.

19. The asymmetrical DFB fiber laser assembly of claim 1 further comprising an optical isolator coupled to an output end of said hi-birefringent, single mode optical fiber.

20. The asymmetrical DFB fiber laser assembly of claim 19 further comprising a feedback loop to stabilize output power.

21. The asymmetrical DFB fiber laser assembly of claim 1 further comprising a feedback loop to stabilize output power.

* * * * *